(12) United States Patent
Gies (10) Patent No.: US 12,459,551 B2
(45) Date of Patent: Nov. 4, 2025

(54) BROKEN RAIL DETECTOR

(71) Applicant: Athena Industrial Technologies Inc., Calgary (CA)

(72) Inventor: Paul D. Gies, Redwood Meadows (CA)

(73) Assignee: Athena Industrial Technologies Inc., Calgary (CA)

( * ) Notice: Subject to any disclaimer, the term of this patent is extended or adjusted under 35 U.S.C. 154(b) by 874 days.

(21) Appl. No.: 17/722,069

(22) Filed: Apr. 15, 2022

(65) Prior Publication Data

US 2022/0234632 A1 Jul. 28, 2022

Related U.S. Application Data

(63) Continuation-in-part of application No. 17/070,693, filed on Oct. 14, 2020, now Pat. No. 11,975,750.

(Continued)

(51) Int. Cl.
*B61L 23/04* (2006.01)
*B61L 1/16* (2006.01)
(Continued)

(52) U.S. Cl.
CPC .............. *B61L 23/044* (2013.01); *B61L 1/163* (2013.01); *B61L 1/165* (2013.01); *B61L 1/18* (2013.01);
(Continued)

(58) Field of Classification Search
CPC ...... B61L 23/044; B61L 23/042; B61L 1/187; B61L 1/18; B61L 1/165; B61L 1/163; G01R 19/04; G01R 19/10; G01R 25/005
(Continued)

(56) References Cited

U.S. PATENT DOCUMENTS

| | | |
|---|---|---|
| 3,683,176 A | 8/1972 | Crofts |
| 3,970,271 A | 7/1976 | Auer et al. |

(Continued)

FOREIGN PATENT DOCUMENTS

| | | | | |
|---|---|---|---|---|
| CN | 106167034 A | * | 11/2016 | ............... B61K 9/08 |
| CN | 104936849 B | | 9/2017 | |

(Continued)

OTHER PUBLICATIONS

Bowden, Richard P, "Broken Rail Detection in Non-Signaled Territory", BNSF Railway Company, 2010.

(Continued)

*Primary Examiner* — S. Joseph Morano
*Assistant Examiner* — James William Jones
(74) *Attorney, Agent, or Firm* — Justin R. Jackson; Deborah A. Peacock; Peacock Law P.C.

(57) ABSTRACT

A method and apparatus to detect breaks in tracks and/or detect the presence of a vehicle, which can include for example a train, in a monitored section of the track or rail. Embodiments of the present invention measure the change in amplitude and/or phase angles. Electrical shunts are connected between the rails at spaced-apart intervals. At least two different frequencies of alternating current are generated and fed into the segments of rail (for example at or near a mid-point between the shunts). If a rail break occurs, the total inductance of the rail at that segment will change. Using two or more frequencies allows a rail break to be differentiated from environmental rail-to-rail and rail-to-earth leakage.

63 Claims, 6 Drawing Sheets

Related U.S. Application Data (60) Provisional application No. 62/914,751, filed on Oct. 14, 2019.

(51) Int. Cl.
  *B61L 1/18* (2006.01)
  *G01R 19/04* (2006.01)
  *G01R 19/10* (2006.01)
  *G01R 25/00* (2006.01)

(52) U.S. Cl.
  CPC ............. *B61L 1/187* (2013.01); *B61L 23/042* (2013.01); *G01R 19/04* (2013.01); *G01R 19/10* (2013.01); *G01R 25/005* (2013.01)

(58) Field of Classification Search
  USPC ......................................................... 246/121
  See application file for complete search history.

(56) References Cited

U.S. PATENT DOCUMENTS

| | | | |
|---|---|---|---|
| 4,306,694 A | 12/1981 | Kuhn | |
| 4,352,475 A | 10/1982 | Smith et al. | |
| 4,442,988 A | 4/1984 | Laurent et al. | |
| 4,932,614 A | 6/1990 | Birkin | |
| 5,680,054 A | 10/1997 | Gauthier | |
| 6,102,340 A | 8/2000 | Peek et al. | |
| 6,216,985 B1* | 4/2001 | Stephens | B61K 9/10 |
| | | | 246/473 R |
| 6,271,754 B1* | 8/2001 | Durtler | G08B 13/2491 |
| | | | 340/567 |
| 6,459,656 B1 | 10/2002 | Futsuhara et al. | |
| 6,655,639 B2 | 12/2003 | Grappone | |
| 6,830,224 B2 | 12/2004 | Lewin et al. | |
| 8,157,219 B2 | 4/2012 | Ashraf et al. | |
| 8,985,523 B2 | 3/2015 | Chadwick et al. | |
| 8,996,208 B2 | 3/2015 | Shoppa et al. | |
| 9,102,341 B2 | 8/2015 | Malone et al. | |
| 9,150,228 B2 | 10/2015 | Grappone | |
| 9,162,691 B2 | 10/2015 | Polivka et al. | |
| 9,669,851 B2 | 6/2017 | Cooper et al. | |
| 9,802,631 B2 | 10/2017 | Matthews et al. | |
| 9,834,237 B2 | 12/2017 | Plotnikov et al. | |
| 10,167,005 B2 | 1/2019 | Noffsinger et al. | |
| 10,351,150 B1 | 7/2019 | Lederman et al. | |
| 10,689,016 B2 | 6/2020 | Woo et al. | |
| 10,822,003 B2* | 11/2020 | Aisa | B61L 1/18 |
| 11,975,750 B2 | 5/2024 | Gies | |
| 2003/0038216 A1 | 2/2003 | Holgate | |
| 2006/0202860 A1 | 9/2006 | Tsai et al. | |
| 2006/0205369 A1 | 9/2006 | Schaich et al. | |
| 2007/0132463 A1* | 6/2007 | Anderson | B61L 1/181 |
| | | | 324/713 |
| 2010/0025545 A1 | 2/2010 | Koval | |
| 2010/0235123 A1 | 9/2010 | Bartonek | |
| 2010/0283437 A1 | 11/2010 | Chung et al. | |
| 2013/0284859 A1* | 10/2013 | Polivka | B61L 1/188 |
| | | | 246/34 R |
| 2014/0044146 A1* | 2/2014 | Harrison | G01M 5/0025 |
| | | | 374/4 |
| 2015/0307117 A1 | 10/2015 | Noffsinger et al. | |
| 2015/0367872 A1 | 12/2015 | Plotnikov et al. | |
| 2016/0244078 A1 | 8/2016 | Noffsinger et al. | |
| 2018/0065650 A1* | 3/2018 | Plotnikov | B61L 3/08 |
| 2019/0061794 A1 | 2/2019 | Noffsinger et al. | |
| 2019/0193762 A1 | 6/2019 | Machado et al. | |
| 2019/0344814 A1 | 11/2019 | Plotnikov et al. | |
| 2019/0370638 A1 | 12/2019 | Green et al. | |
| 2021/0107541 A1 | 4/2021 | Gies | |

FOREIGN PATENT DOCUMENTS

| | | |
|---|---|---|
| DE | 2121971 A1 | 11/1971 |
| DE | 2623967 A1 | 12/1977 |
| EP | 1603785 B1 | 5/2008 |
| EP | 2090491 A1 | 8/2009 |
| FR | 2303900 A1 | 10/1976 |
| GB | 2311190 A | 9/1997 |
| WO | 2016182994 A1 | 11/2016 |

OTHER PUBLICATIONS

Burger, Francois A, "A Practical Continuous Operating Rail Break Detection System Using Guided Waves", Institute for Maritime Technology, 18th World Conference on Non-destructive Testing, Durban, South Africa, Apr. 20, 2012.

Kindt, Joel , et al., "Next Generation Track Circuits", U.S. Department of Transportation Report No. FRA/ORD-18/10, Apr. 2018.

Turner, Steven , "Feasibility of Locomotive-Mounted Broken Rail Detection", Final Report for High-Speed Rail Innovations Deserving Exploratory Analysis Programs (IDEA) Project 38, Jun. 21, 2004.

Whalen, R. B, et al., "Lightweight Vehicle Track Shunting", U.S. Department of Transportation Report No. FRA/ORD-81/56, Apr. 1981.

* cited by examiner

BROKEN RAIL DETECTOR

CROSS-REFERENCE TO RELATED APPLICATIONS

This application is a continuation-in-part application of U.S. patent application Ser. No. 17/070,693, entitled "Broken Rail Detector", filed on Oct. 14, 2020, which itself claims priority to and the benefit of the filing of U.S. Provisional Patent Application No. 62/914,751, entitled "Broken Rail Detector", filed on Oct. 14, 2019, and the specifications and claims (if any) are incorporated herein by reference.

BACKGROUND OF THE INVENTION

Embodiments of the present invention relate to a method and apparatus to detect breaks in a track, such as a rail line, and the ability to detect the presence of a train or rail car or other rail vehicles with conductive axles in a monitored section of track.

Existing technologies for detecting breaks in railroad tracks usually require significant modifications to the rail or the addition of various types of sensors, which can include wires and/or fiber optics. Such known systems suffer from high installation costs, often require complicated maintenance procedures which necessitate specialized personnel and equipment. Such known systems can result in detection reliability errors caused by the severe conditions that most railroad tracks experience. Existing technology for detecting the presence of trains in a section of rail usually involve the wheels and axles completing a circuit in an isolated section of rail, proximity detection of the metal in the train, or detection of identification transponders mounted to locomotives and/or rail cars. Rail isolation can be achieved by using shunts of different types and in some cases insulated joints. Insulated joints associated with rail crossings are common in urban areas.

There is thus a present need for a method and apparatus that involves only minor cost, minor modifications to the installation of new or existing rails, no additional infrastructure installation, and no specialized installation and maintenance personnel. There is further a present need for a method and apparatus which has significantly lower susceptibility to environmental effects on a rail track than do existing technologies.

BRIEF SUMMARY OF EMBODIMENTS OF THE PRESENT INVENTION

Embodiments of the present invention relate to a detector that includes a circuit configured to inject at least two frequencies of alternating electrical current into a shunted segment of a track, and the circuit configured to measure an amplitude difference and a phase angle between the at least two frequencies of alternating current and identify a break in at least a portion of the track based on a change in the measured amplitude difference and phase angle. The track can include a rail track. The shunted segment of the track can include an electrical shunt disposed at opposing ends of the shunted segment of the track. Optionally, the electrical shunt can include an electrical conductor that is electrically connected between two rails of the shunted segment of the track. The circuit can be electrically connected at or about a midpoint of the shunted segment of the track.

In one embodiment, the circuit can be configured to monitor current flow to the shunted segment of the track, and/or configured to measure an amplitude of the at least two frequencies of alternating electrical current to cancel out common parasitic resistance of the shunted segment of the track. The detector can also include a communications unit. The communications unit can be configured to provide data telemetry. Optionally, the communications unit can include a radio frequency transmitter. The detector can be configured to transmit data and to relay data received from another detector. Optionally, the detector can also include a communication node configured to receive data from the detector and the communication node can be configured to transmit the data. In one embodiment, the circuit does not determine a break in the track merely by identifying a drop in current flow through all or a portion of the shunted track segment.

Embodiments of the present invention also relate to a method for detecting a break in at least a portion of a track, the method including forming a track segment by establishing an electrical shunt at each end of the track segment, injecting at least two frequencies of alternating electrical current into the track segment, monitoring a phase angle between the at least two frequencies of alternating current, and transmitting data indicative of a break in the track. Establishing an electrical shunt at each end of the track can include selecting a portion of track which is bounded by at least one existing electrical shunt. The track can include a rail track.

In one embodiment, indicia of a break is generated in response to an observed positive amplitude shift from a baseline reference point for a lower of the two frequencies of alternating current in addition to a negative phase shift being observed in a higher of the two frequencies of alternating current. In one embodiment, the method does not merely determine a break in the track segment based on reduced current flow through all or a portion of the track segment. Optionally, transmitting data indicative of a break can include transmitting an alert of a break and/or transmitting data of or relating to the phase angle between the at least two frequencies such that a determination of a break can be determined. Transmitting data indicative of a break can include transmitting data via a radio frequency of less than about 200 kilohertz. The method can also include monitoring a voltage of the at least two frequencies of alternating electrical current and using data from the monitored voltage to cancel out common parasitic resistance of the shunted segment of the track.

The method can also include relaying data received from an apparatus that is configured to monitor a different track segment. The method can also include providing a communication node that is configured to receive data from a plurality of monitoring devices, and/or transmitting data indicative of a presence of a vehicle on the track segment. The vehicle can be a train or portion thereof and the track can be a rail track.

Embodiments of the present invention also relate to a method for detecting a condition of rail tracks that includes forming segments of the rail tracks by coupling shunts between rails of the rail tracks at intervals, providing a plurality of detectors and coupling a respective one of the plurality of detectors to a respective one of the formed segments of rail tracks, providing at least two frequencies of alternating electrical current to the respective one of the formed segments of rail tracks, evaluating a change in signal amplitude above a baseline reference in at least one of the at least two frequencies, and evaluating a phase angle difference between the at least two frequencies of alternating electrical current; and detecting the condition based on a change in the signal amplitude and phase angle difference between the at least two frequencies. The shunts can include wires and/or cables. The shunts can include filters that are tuned to pass operating frequencies but attenuate other frequencies, which other frequencies can optionally include direct current. In one embodiment, a bypass can be formed in a section of rail tracks by disposing the shunts on either side and/or both sides of the bypass section and not disposing a detector in the bypassed section. Forming a bypass section can include forming a bypass section at or near a location of rail equipment such that the rail equipment lies within the formed bypass section. The rail equipment can include a wheel condition detector. In one embodiment, axles of all moving trains move with respect to the plurality of detectors. In one embodiment of the method, the condition can include a rail switch position, a break in a portion of the rail tracks, and/or a train presence condition when a train is disposed on at least one of the segments of the rail tracks. Detecting the train presence condition can include detecting a negative amplitude shift for the at least two frequencies in addition to a positive phase shift for the at least two frequencies.

Optionally, detecting a break condition can include detecting the break when a positive amplitude shift relative to an amplitude of a higher of at the at least two frequencies from the baseline reference is observed in a lower of the at least two frequencies of alternating electrical current in combination with a negative phase shift relative to a phase shift of a lower of the at least two frequencies in a higher of the at least two frequencies of alternating electrical current.

The baseline reference can be compensated for environmental effects by normalizing signal amplitude values relative to phase values when no trains are present and when no breaks are present. Optionally, the detected condition can include a change in rail stress, which stress change can be formed in response to a break in at least one of the segments of rail tracks at a location other than a segment of the rail tracks where the rail stress is detected. The rail stress can be formed by thermal expansion and/or thermal contraction of the rails of the rail tracks.

Embodiments of the present invention also relate to a detector that includes a circuit configured to provide at least two frequencies of alternating electrical current to a shunted segment of a track, the circuit configured to measure an amplitude difference and a phase angle between the at least two frequencies of alternating electrical current and identify a break in at least a portion of the track based on a change in the measured amplitude difference and phase angle, and the detector not disposed on a train or moving vehicle. In one embodiment, the detector does not travel with respect to the shunted segment of the track while the detector is in operation. The circuit can provide the at least two frequencies of alternating electrical current via a direct electrical connection to rails of the shunted segment of the track and/or via induction into a rail of the shunted segment of the track. The circuit can be configured to measure via direct electrical connection to rails of the shunted segment of the track and/or via induction into a rail of the shunted segment of the track. The detector can also include an isolation transformer. Optionally, the circuit can be configured to provide at least two frequencies of alternating electrical current into two shunted segments of a track. The two shunted segments of a track can include two adjacent segments of a track. The amplitude difference can include a difference between a current amplitude and a reference amplitude. The phase angle between the at least two frequencies of alternating electrical current can include a difference between a current phase and a reference phase.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Embodiments of the present invention detect breaks in a track, such as a rail track, and detects the presence of a train, train car or other rail vehicle on a portion of the track, by treating a portion of the track as a long conductor. As such it has two dominant properties, resistance and inductance. Reliance on a change in resistance, caused by a break in the rail (conductor) is commonly used in existing technologies. This property is subject to the effects of rail contamination that allows current to leak into the earth, through dirt and moisture, and bypass the break. Special procedures are required to mitigate this problem.

Referring now to the figures, detector 10 preferably takes advantage of the inductive properties of rail tracks 12 and cancels out the environmental effects. To achieve this, rail tracks 12, which are preferably formed from a plurality of individual rails 14 arranged in parallel and disposed a distance from one another, are preferably electrically shunted together via track-to-track shunts 16. Shunts 16 preferably include, for example, a wire connected between a pair of rails 14. Although shunts can comprise almost any desired size or diameter, in one embodiment, shunts 16 most preferably comprise about 20 gauge to about 8 gauge wire and more preferably about 16 gauge to 12 gauge wire and most preferably about 14 gauge wire. Although the connection of shunts 16 can be made at any desirable location or configuration, in one embodiment, shunts 16 are most preferably permanently bonded to the web or foot of the rail. Shunts 16 are most preferably formed from a stranded steel cable, but can be formed from other materials and structures, and can optionally include existing connections—for example, shunted connections associated with existing infrastructure, which can include for example portions of warning circuits associated with active crossing warning systems. Most preferably, a plurality of shunts 16 are disposed along rail tracks 12 at a predetermined distance interval (See FIG. 1A). The predetermined distance interval can optionally be made large—for example greater than 100 feet, more preferably greater than 1,000 feet, and most preferably about one mile or more. At some point between a pair of shunts 16, which can include for example near a mid-point of the distance between a pair of shunts 16, a connection is made to each rail 14 and a signal generator 18, which is preferably equipped with or otherwise coupled to a current sensor 20, which can include for example, a voltage measurement taken across a known resistance, which itself can include a measurement across resistor 21. Although in one embodiment, connection is most preferably made at or near a mid-point of a segment of rail tracks 12, in one embodiment, the apparatus and method can provide desirable results when connection is made anywhere from about ¼ to about ¾ of the length of a rail segment.

Figure 1A:
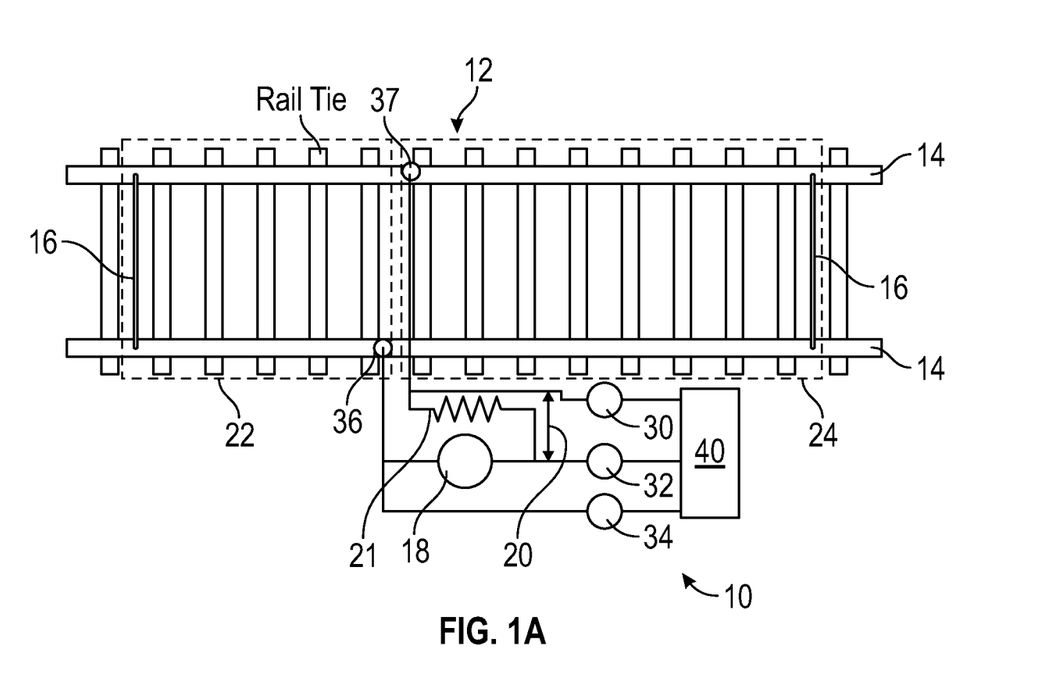
FIG. 1A is a drawing which schematically illustrates a broken rail detector according to an embodiment of the present invention.
Figure 2:
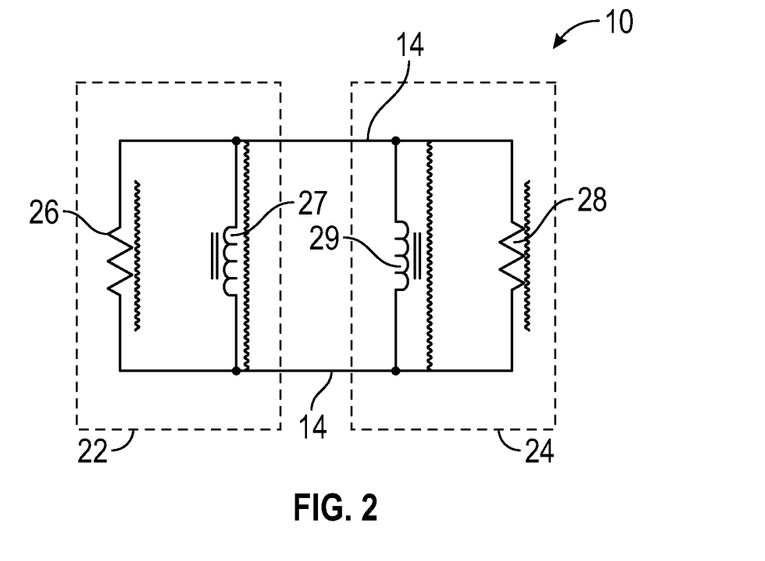
FIG. 2 is a drawing which schematically illustrates an electrical equivalent of a shunted portion of railroad tracks.

FIG. 2 illustrates an electrical equivalent circuit of the configuration formed by detector 10. As can be seen, electrically, the shunted portion of rails 14 behave as parallel inductors, first loop 22, and second loop 24, when signal generator 18 and current sensor 20 (see FIG. 1A) are connected thereto, thus providing unknown parasitic resistance 26 in first loop 22, which is in parallel with rail inductance 27, and in second loop 24, unknown parasitic resistance 28 which is in parallel with rail inductance 29. Parasitic resistances 26 and 28 are caused by environmental contamination of the rails, usually from combinations of dirt, rain, snow, standing water, etc. Environmental effects also occur from heating and cooling cycles during the day as well as resistivity changes at bolted joints. Signal generator 18 preferably applies an electrical signal to rails 14. Most preferably the signal applied is a relatively low frequency—for example, less than 100K Hertz ("Hz") and most preferably less than 10K Hz. Optionally, the frequency can be less than 1K Hz and/or less than 100 Hz.

The signal detected at point 30 of FIG. 1A is preferably measured for both amplitude and phase relative to the signal measured at point 32. The signal detected and/or measured at points 30 and 32 are preferably made with respect to common point 34. Optionally, a section of track can be divided into segments and each segment can be monitored via an embodiment of the present invention and a circuit for monitoring each segment is occasionally referred to herein as a "node" such that a length of track is monitored by a plurality of nodes. Signal injection and detection points 36 and 37 together serve as a monitoring point for a segment or section of rail tracks 12. Thus, if a span of 100 miles of rail tracks were divided into 100 segments that were each one mile long, and if each segment had detection points 36 and 37, there would thus be formed 100 nodes for that 100 miles of rail tracks. If a break occurs in either, or both, of first loop 22 and/or second loop 24, the inductance presented at detection points 36 and 37 will change and there will be a resulting change in both the amplitude and phase of the signal detected at point 30. This amplitude will also be affected by the amount of parasitic resistance that is present. It cannot be assumed that the parasitic resistance is constant or in any way predictable. By applying two different frequencies (for example 100 Hz and 500 Hz) to the rail loops, the common parasitic resistance can be cancelled out by measuring the ratio of the amplitudes of the two frequencies detected at point 30. This assumes that the amplitude of both frequencies at point 32 is the same. If not, the signals measured at point 30 are preferably normalized accordingly. Further, the measured phase angle for each frequency can be used to detect the presence of a break. This can be done with a single frequency or multiple frequencies. With a single frequency, unknown parasitic factors can cause errors in the defect detection. Crossing control systems that use a method that operates on a single frequency, instead of a plurality of different frequencies as is preferably used in embodiments of the present invention, must operate at fairly high power levels (10's of watts), and over comparatively short lengths of several hundred feet; whereas embodiments of the present invention were tested and found to provide desirable results using only about 1 watt of power to perform a test sequence on a 1-mile section of rail.

The ratio of the phase angles between the two frequencies can be used to further improve accuracy of the break detection. A simplified example of this process is illustrated in the measured test data of Tables 1 and 2 as further discussed in the Example 1 below.

As can clearly be seen in the example data of Tables 1 and 2, there is a change in inductance associated with a rail break condition. Conversely, the presence of a train in the monitored section of rail tracks 12 causes a corresponding reduction in the measured inductance value as the train wheels and axles create shorter conductor loops by shunting the rails at positions closer to the detection point.

The rail shunts also act to isolate track sections. Using the measurement methodology described above, rail break and train presence events that occur before the left shunt or after the right shunt are not detected. This allows a detection event to be positively associated with a section of rail monitored by a given node. If the measurement point is not centered in the monitored rail section it is possible to determine which side of the node the detection event occurred on.

During a normal test sequence, only a small number of cycles (for example, about 10 or less) of each frequency are required to complete a detection test. This enables testing to be performed very rapidly, thus resulting in nearly instantaneous testing of an entire section of rail tracks 12.

Data communication module 40 is preferably communicably coupled to detection points 30, 32, and 34 and can thus communicate to a hub or other location, measured results and other data (for example a status indicator, which can include for example the detection of an improperly functioning circuit and/or a low or loss of power indicator).

In one embodiment, data communication module 40 can include a node box which has space to mount a variety of data telemetry technologies. As such, each data communication module 40 can accommodate any of various data telemetry systems. Such various data telemetry systems can include not only low frequency RF communications, but can optionally include, in rail data transmission, conventional radio-based modems, cellular systems, satellite, fiber optic, internet-based, conventional telephone lines, combinations thereof and the like, as well as any other known data transmission protocols and/or systems. For example, rail tracks which pass from a vast open area through a city and back through an expanse of open area can optionally include low frequency RF data transmission in the open areas but can include cellular and Internet data transmission along portions of the rail tracks that pass through a city. Thus, a single length of rail tracks can be monitored and the data generated thereby can be transmitted by a combination of different communication systems and/or protocols. This flexibility allows the telemetry hardware to be tailored to various environments.

Optionally, a daisy chain communication system can be used. Also optionally, each data communication module 40 can have a unique identification (i.e. a "node ID"), and/or a mile marker indicia. Each communication node 50 can optionally have a table of the unique identifications of the various data communication modules and also preferably of their corresponding mile marker indicia, in a monitored subdivision.

Data can be transmitted as messages and can optionally include an identification sequence number in addition to the node ID and mile marker indicia for the node that sourced the message. Each message also preferably contains the node ID and mile marker indicia of the node that relayed the message. These values can be the same as the source node for the first relay. When a node broadcasts a message (i.e. when data communication module 40 broadcasts a message), it can be detected by the data communication module 40 of one or more adjacent nodes.

The telemetry logic is preferably configured so that a message from a data communication module can be transmitted sequentially (for example node-by-node in each direction), thus resulting in ascending and descending node and mile marker indicia. Optionally, confirmation of a received message can be sent back to the previous node before being passed on to the next node. This methodology allows corrupted or lost transmissions to be retried. Still further, sending the data in both directions allows the message to reach at least one communication node 50, and likely two. Optionally there can be more than one communication node 50 in any given sub-division of rail tracks. In one embodiment, one or more, or even all data communication modules 40 can optionally be configured to communicate directly with one or more communication nodes 50, without requiring the data to be relayed through other data communication modules. This can be particularly advantageous in urban areas with a significant amount of existing communication infrastructure.

When a broken rail or train presence event is detected, it is preferably communicated to a data hub or a central location so that the appropriate action can be taken. The railroad environment is highly varied and does not generally allow for the consistent application of radio or other communication methods without a considerable investment in supporting infrastructure. Controlled crossings and urban rail sections often already have this infrastructure in place. Rail lines in rural or remote areas may only have communication capabilities at controlled crossings or at specific sections of instrumented track. Un-monitored rail sections are referred to as dark territory.

Embodiments of detector 10 preferably do not require the construction of additional communication infrastructure to each detector for each segment of rail tracks 12. Instead, low frequency radio waves are preferably used to communicate between detectors. Optionally, a rail can be used as a conductor for long wavelength electromagnetic signals or as an antenna when an insulated rail joint is encountered—for example, as are used for some types of controlled crossings.

Low frequency radio communication is rarely used now due to its very low data rate capabilities and the typically very long antennas that are needed, which can exceed 1000 feet in length. Using the rail itself as an antenna or signal conductor solves this problem. Remote car starters and key 'fobs' commonly use this frequency band but do not operate at the power levels required to interfere with the signals used in data communication module 40.

Figure 1B:
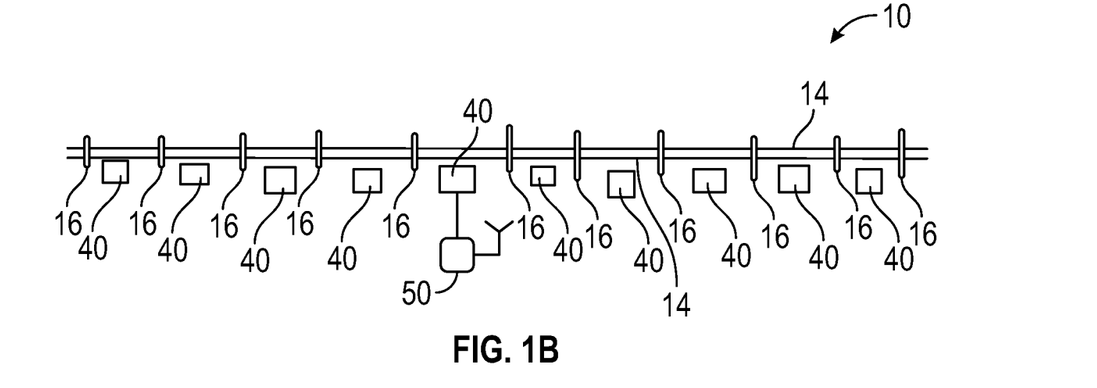
FIG. 1B is a drawing which illustrates a length of rail tracks that are monitored by a plurality of nodes and which communicate information to a communication node according to an embodiment of the present invention.

Optionally, a length of rail tracks 12 can be divided into a plurality of monitored segments which are each monitored by a separate detector 10. Optionally, detectors 10 can be placed at intervals of approximately 1 mile along a section of rail tracks 12 to be monitored. Each detector 10 is preferably independently powered and operates independently of other detectors for other segments of rail tracks 12. It is possible that more than 100 detectors can form a group monitoring a section of rail tracks 12. A monitored section of rail tracks 12 is occasionally referred to herein as a "sub-division". Over the course of several monitored segments (for example over the course of 100 miles), there can be a point where a preexisting data communication point exists (for example a 'Hot-Box', which can be provided for example at a monitored crossing). At this point, communication node 50, (see FIG. 1B) which can optionally include a detector 10 (which if provided can also monitor a segment of rail tracks 12), can be placed. Regardless of whether a communication node 50 is connected to an accompanying detector for that particular segment of rail tracks 12, communication node 50 preferably communicates with the other detectors 10 by passing data from detector 10 to detector 10 (or at least the data communication module 40 thereof) along the monitored section of rail tracks 12. As such, data communication module 40 can be configured to relay communications received from other detectors 10, such that data from one detector is relayed through the communication module 40 of other detectors 10 until the data finally reaches communication node 50 where it can be transmitted (for example where it can be transmitted via previously installed communications infrastructure). This methodology is generally much less susceptible to environmental effects such as line-of-sight, snow cover, foliage effects, and interference of other common radio technologies.

The data communication method used by embodiments of the present invention requires very low power at each detector 10 and allows each detector to optionally be powered by a battery with a small solar panel for recharging. Very low power consumption is required for areas where there are extended periods of low light levels (for example northern areas) or when detectors 10 are covered by snow.

With respect to the inter-node data communications system that is preferably implemented via data communication module 40, terrain problems can include line-of-sight obstructions, foliage absorption and snow cover, which can limit the use of very high frequency and microwave bands of radio telemetry. A low frequency radio band can be used and will provide desirable results. Most preferably, data communication module 40 transmits, receives, and/or relays data at a about 10 Khz to 500 Khz and more preferably at about 50 kHz to about 200 kHz frequency range. Telemetry power consumption is most preferably less than about 0.2 watts and more preferably less than about 0.08 watts in the receive mode. In one embodiment, communication module 40 can transmit and/or relay data at a rate of about 100 to about 2,000 bits per second and more preferably at a rate of about 500 bits per second.

In one embodiment, a rail break is determined when a positive amplitude shift from a baseline reference point is observed in a lower test frequency while a negative phase shift is observed in a higher test frequency. In one embodiment, a train presence is determined when a negative amplitude shift is observed in addition to a positive phase shift for all frequencies. In one embodiment, the baseline reference level is preferably compensated for environmental effects by normalizing the amplitude values relative to the phase values when no trains are present and when no break defects are present.

In one embodiment, a break and/or train presence can be determined by amplitude and/or phase relationship between at least two frequencies. In one embodiment, shunts 16 can be simple wires connecting rails 14 to form the shunted rail loop. Optionally, however, shunts 16 can be an electrical filter that is tuned to passes the operating frequencies but attenuate or block other frequencies, which can optionally include direct current that may or may not be associated with other equipment or instruments that are electrically connected to rail tracks 12.

Optionally, shunts 16 can be used to bypass sections of a rail that contain switches, crossings, rail frogs (an intersection between 2 rails) or any other desired area. In this embodiment, shunts 16 are preferably installed across rails 14 on both sides of the equipment, thus forming a track segment that contains the equipment. However, a detector circuit is preferably not disposed in the segment containing the equipment. This same isolation configuration can be used to isolate wheel condition detectors, or other devices that may interfere with operation of detector 10. In addition, the same isolation technique can be used to isolate any equipment that may be adversely affected by normal operation of detector 10.

In one embodiment, train presence can be determined by conductive train axles causing a moving shunt that acts to change the properties of the monitored track loop. When detector 10 is in operation, the length of the rail loops on each side of the connection point are fixed. This means that for any given set of environmental characteristics the ratio of inductance between the left and right loops is constant. When a train axle is present, it acts to shorten one of the rail loops as it enters the monitored section. This in turn reduces the inductance of the entry loop and changes the ratio of inductance between the left and right loop. The characteristics of this change are detected by detector 10. As the train continues into the monitored section, the first rail loop length is reduced to zero when the train is adjacent to the connection point of detector 10. Many, if not most, freight trains are now of great length and may simultaneously occupy two or more monitored sections of rail tracks 12. So long as the train axles are in the immediate proximity of the connection point, the loop lengths, both on the entry and exit sides of the monitored area, are at or near zero. As the last axle of the train moves past the connection point, the entry loop length has returned to its original length and inductance characteristics while the loop on the exit side is starting at zero length and is now becoming longer, eventually returning to its original length and inductance characteristics. The changes in the inductance ratios between the entry and exit loops can be used to determine the location of the axles in the monitored sections of rail tracks 12. Furthermore, by correlation of the data from adjacent monitored sections, the location of the front and rear, as well speed and direction, can be determined by detector 10.

Rail switch position can optionally be detected by monitoring the change in electrical properties of the monitored loop. These changes are caused by the movement of the rail switch machinery. For example, in one embodiment, the change in rail switch position can change the effective length of a loop that is monitored by detector 10, thus enabling detector 10 to detect the switch position and report it periodically or when queried for position status.

In one embodiment, rail breaks can be detected by changes in the monitored loop that are caused by the change of rail stress which occurs when a break is created in an adjacent or near-by track section. This effect can extend for several miles and can be detected by several detectors 10 positioned along several sections of rail tracks 12. A change in rail stress as a function of temperature can also be determined by changes in the rail electrical properties that are the result of structural strain in the monitored rail section. Typically, when a rail break occurs there is a frequency dependent change in the inductance properties of adjacent, connected, rail sections. This effect appears to extend for between about two to about four miles on either side of the break. The effect decreases as distance from the break increases. This effect allows for the determination of an approximate location for the break. This can be useful for determining if a break has occurred in an unmonitored area (for example, in a controlled crossing or bridge), that is between two or more monitored sections. The characteristic response often lasts for several minutes before typically recovering to near the original state. Extracting the information can be performed by analyzing data from several adjacent sections and checking for the characteristic signature occurring at the same time at two or more monitored sections of rail tracks 12. This further illustrates the ability of a plurality of detectors 10 operating as part of an extended array.

Train location in a monitored section of rail tracks 12 can be determined by measuring the change in amplitude and/or phase of the generated signals. Changes in the amplitude and phase of the generated signals occurs as the train moves through the monitored section and causes the electrical length of the rail loop change. This follows a predictable profile and allows the train location in the loop to be determined. These characteristics also allow the approximate speed of the train to be determined using detector 10. The measured frequencies can be introduced into the rail by direct or indirect methods. Direct introduction of the generated frequencies can be done by wire connections directly to the rails, most preferably at the approximate midpoint of the rail loop. It has been found that a desirable attachment range is about +/−30% of the rail loop length relative to the center point of the section of rail tracks 12. Indirect introduction of the frequencies can be done by induction. For example, this can be done by placing a length of wire parallel to a rail that forms part of the monitored rail loop. A current passed through the wire operating at the measured frequencies. The magnetic field created by this current flow induces a current of the same frequency in the monitored loop section.

Figure 4A:
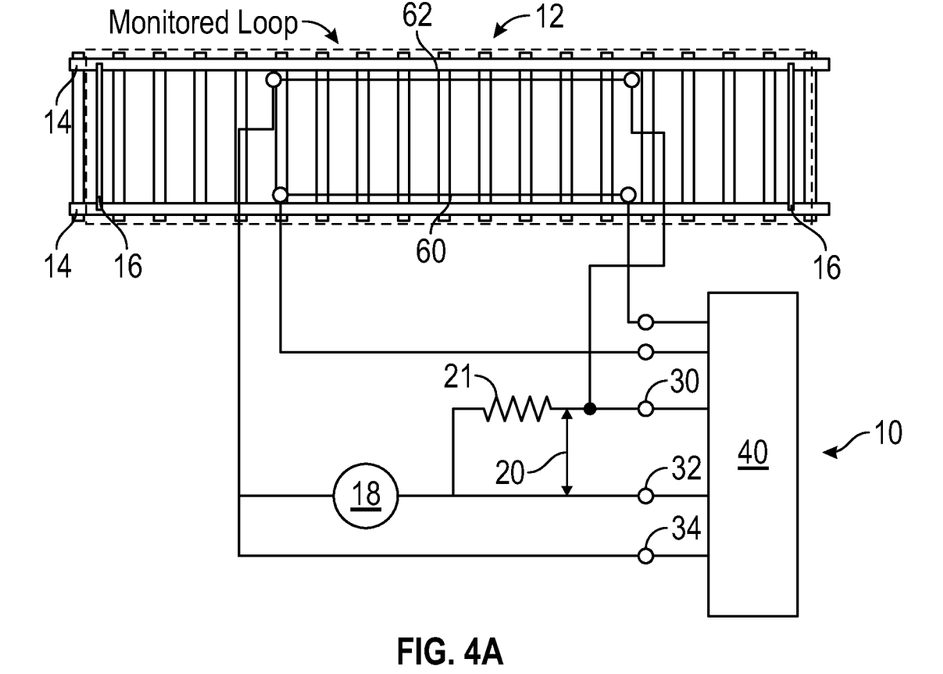
FIG. 4A is a drawing which schematically illustrates a broken rail detector that is configured to inductively couple to rails via parallel conductors.
Figure 4B:
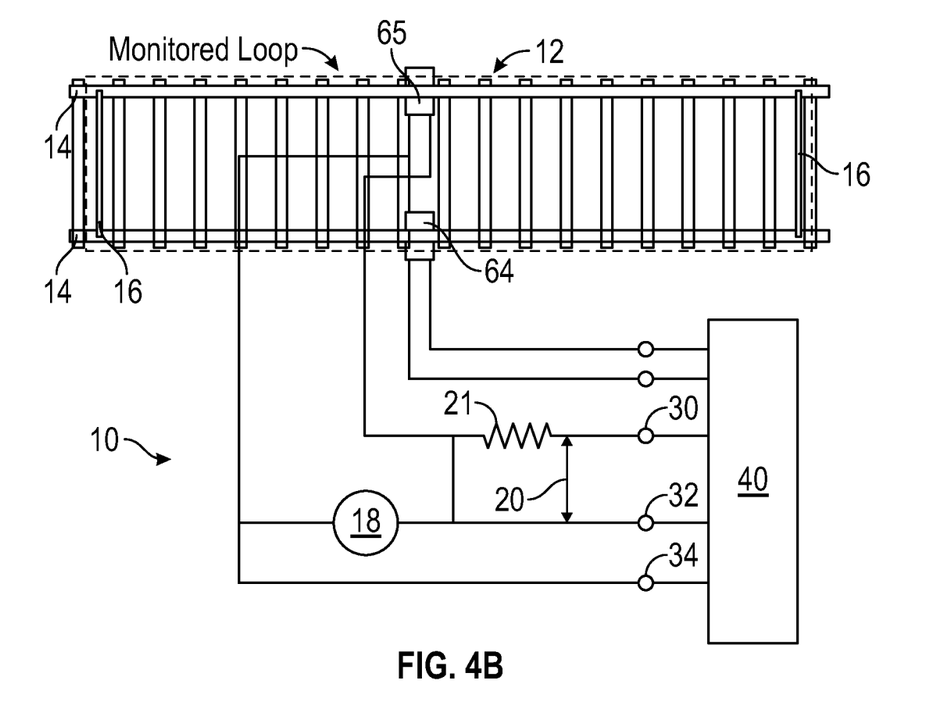
FIG. 4B is a drawing which schematically illustrates a broken rail detector that is configured to inductively couple to rails via coils.
Figure 4C:
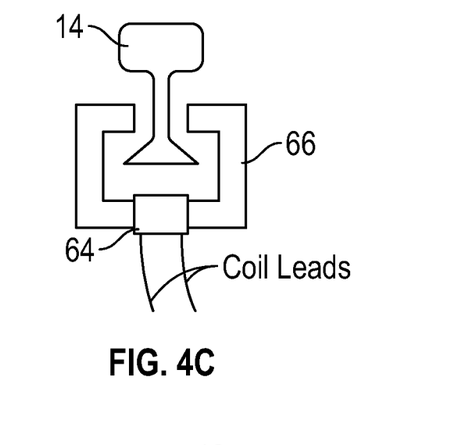
FIG. 4C is a drawing which illustrates an inductive coil configuration according to an embodiment of the present invention.

Sensing of the electrical currents can likewise be determined by either direct or indirect connection to the rails of the monitored loop section. In this embodiment, direct measurement of the generated frequencies can be done by wire connections directly to the rails, most preferably at the approximate midpoint of the section (see FIG. 1A). It has been found that a desirable attachment range for this connection is also about +/−30% of the rail loop length relative to the center point of the loop. The connection of the signal measurement equipment can but does not need to be coincident with the frequency generating equipment. Likewise, indirect measurement of the generated frequencies can also be done inductively (see FIG. 4A). This can be done by placing a length of wire 60 parallel to a rail that forms part of the monitored section of rail tracks 12. In this configuration, wire 60 functions as a receive wire to inductively pick up electrical signals flowing through the rail inductively. A current passed through the adjacent rail generates a time varying magnetic field that generates a voltage in the adjacent monitoring wire. In the parallel wire configuration, the parallel wire acts in the same manner as coaxial coils in an air core inductor. Likewise, the electrical signals can be injected into rail tracks 12 inductively as illustrated in FIG. 4A. In this embodiment, a length of wire 62 is placed along rail 14 and the signal is applied to wire 62, thus causing wire 62 to be a drive wire and induce a signal into the adjacent rail. Most preferably, drive wire 62 is positioned to drive one of rails 14 while receive wire 60 is positioned to monitor another rail 14. Wires 60 and/or 62 need not be parallel with their respective rails. Rather, any shape and position which enables induction between the wire and rail 14 can be used. For example, wires 60 and/or 62 can be wound into coils 64 and/or 65 (see FIGS. 4A and 4B). Likewise, wires 62 can be wound into coil 65, and a core 66 can be shaped to provide better inductive coupling between coil 64 and rail 14. In one embodiment, core 66 can comprise a laminated iron core and/or ferrite core and can optionally have a C-shape which partially encircles a bottom portion of rail 14. For embodiments wherein the signal is injected into the rails inductively and/or detected via induction, a single detection loop is formed in a rail segment. This is because a break to either side of the injection/detection points will result in changes to the received signal.

For this embodiment there is most preferably one wire against one rail (but electrically insulated from the rail). This serves as the signal driver and induces an electrical current into the rail. This process follows Faraday's law of inductance. The receiver is preferably coupled on another rail but can be coupled at any point in the rail loop. In this configuration the system behaves as a single loop. All the principles of break detection still apply.

Figure 5A:
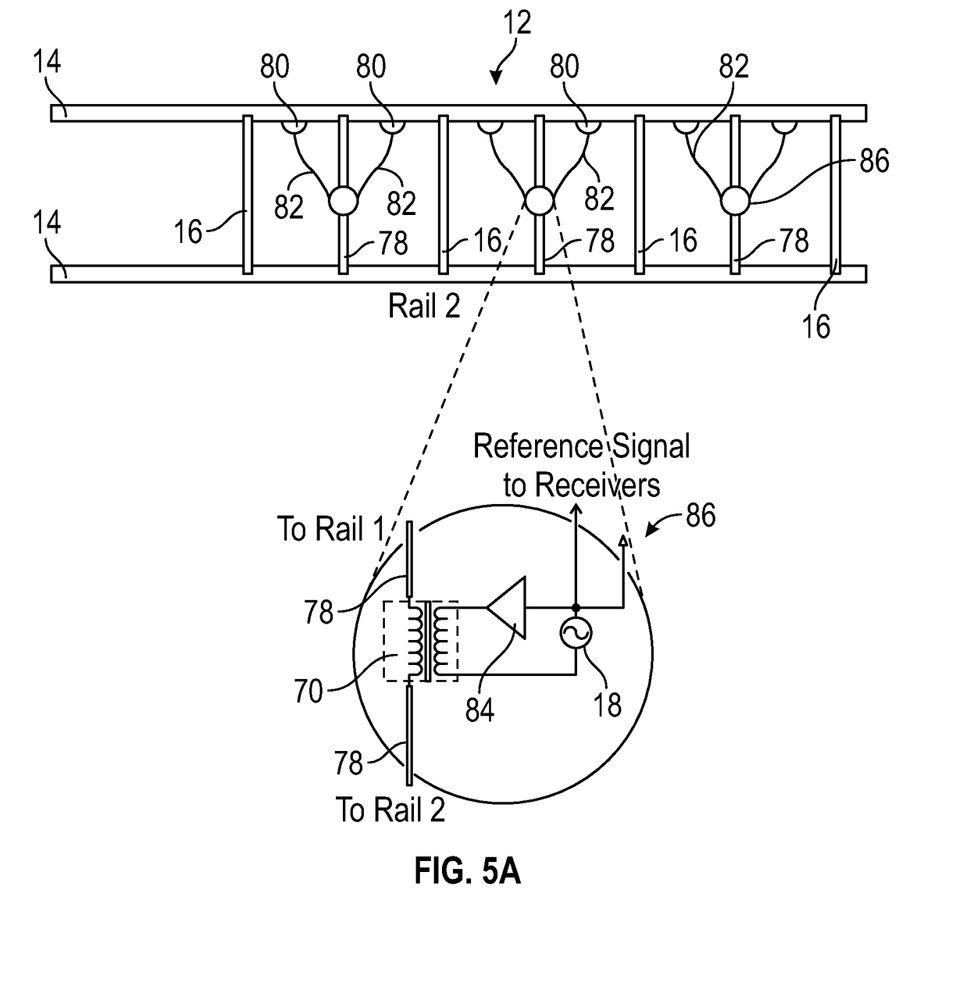
FIG. 5A is a drawing which illustrates a configuration wherein signals are input into rails via injection shunts and wherein a pair of adjacent segments are monitored by remotely positioned signal detectors.
Figure 5B:
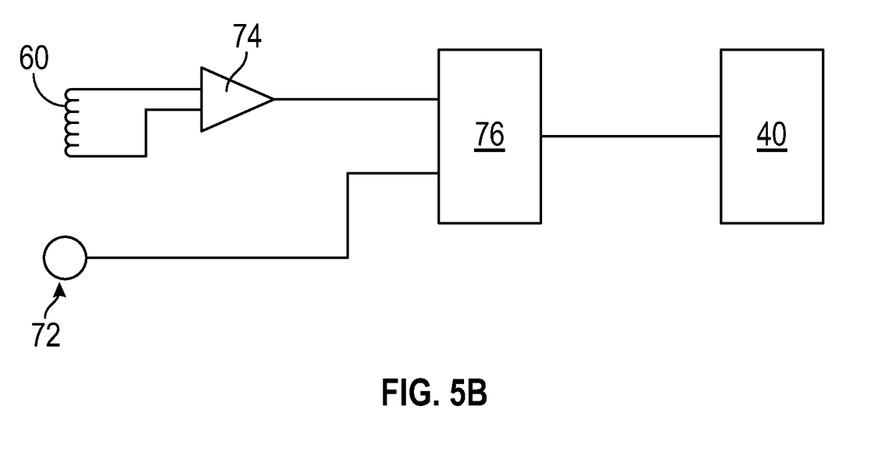
FIG. 5B is a drawing which illustrates a configuration for a signal detection-portion of a detector according to an embodiment of the present invention.

The generated operating frequencies can be part of a frequency cycle, a single cycle or multiple cycles. The operating frequencies can be generated consecutively or be mixed into a combined waveform. Circuitry in the detection electronics can be used to extract amplitude and phase information for each of the generated frequencies. In order to accomplish this, in one embodiment, no circuitry modifications are required. Rather, this can be implemented in firmware to demultiplex the received signals back into the separate frequencies. Signals to and from the rail can optionally be connected by a combination of direct and indirect methods. Transformer 70, which can be an isolation transformer, can optionally be used. In this embodiment, one winding of transformer 70 is preferably attached to the signal generation circuit, or the signal monitoring circuit, and the other side of the transformer is electrically connected to rail 14. In one embodiment, the transformer 70 (see FIG. 5A) can be a 1:1 ratio or it can be a step-up or a step-down transformer. For example, in one embodiment, isolation transformer 70 can comprise a step-down configuration for impedance matching for signal injection into the rail while another isolation transformer 70 can comprise a step-up configuration for passive signal amplification and impedance matching for signal detection. In this configuration, the receive side can then be followed by active signal filtering and amplification. Note that FIG. 5A is not drawn to scale as in a most preferred embodiment, the distance between adjoining rails 14 is preferably significantly closer together than the distance between shunts 16 and injection shunts 78. As best illustrated in FIGS. 5A and 5B, in one embodiment, signal generator 18 can be located at or near a shunt location that forms the end portion for two adjacent monitored sections of rail tracks 12. The output can be split to drive the injection signal for the two adjacent rail segments simultaneously. In this configuration there is preferably a single signal generator 18 driving two monitored rail segments (the portions from injection shunt 78 to an adjacent shunt 16). In this embodiment, injection shunt 78 is preferably configured such that a second winding of isolation transformer 70 is preferably in series with injection shunt 78. Signal detectors 80 are preferably coupled to detector 10 via connection cable 82. Most preferably, signal detectors 80 are disposed at or near a central portion rail 14 on both sides of detector 10 so as to enable monitoring of both adjacent rail sections where detector 10 is disposed. In one embodiment, signal detectors 80 can be inductively coupled as previously described, or signal detectors 80 can each comprise two wires which can connect to a respective one of rails 14. In one embodiment, signal generator 18 can be coupled to isolation transformer 70 for injecting a signal with intervening drive amplifier 84. This enables the injection signal from signal generator 18 to be amplified to any desirable level. Optionally, the connection from signal detectors 80 to detector 10 can be made inside the node, for example, detector 10 can be spatially split apart such that the portions of detector 10 which are responsible for signal injection (injection portion 86) can be disposed at or near injection shunt 78, while portions for detection and data processing and transmission can be disposed at or near a center portion of each segment of rail to be monitored. In this embodiment, signal generator portion 18 can optionally provide the detection portion of detector 10 with a reference signal so that the signal detection portion of detector 10 will have accurate information on the injection signal. In one embodiment, this can be done by providing a direct physical electrical connection between the signal detection portion of detector 10 and the signal injection portion of detector 10. Alternatively, however, the signal injection portion can wirelessly transmit the injection signal to the receiver portion of detector 10.

As best illustrated in FIG. 5B, data processor 76 is preferably provided. Optionally data processor 76 can be incorporated with the rest of the electronics of detector 10, or data processor 76 can be a separate unit which receives and process data apart from the rest of detector 10. Most preferably, data processor 76 acquires the data and processes it to produce the results that are to be transmitted from the detector 10. For the embodiment wherein injection portion 86 is spatially separate from detection portion of detector 10, signal lines from injection portion 86 preferably provide timing reference information to processor 76 so that processor 76 can perform analysis as described in more detail above to detect train presence, rail break, and/or any of the other detections previously described. Processor 76 can then send information to communication module 40 to be transmitted.

An embodiment of the present invention uses signals for rail break detection, train presence detection and data communication that are at frequencies and power levels that are highly unlikely to affect existing signaling and other infrastructures that are normally present on an operating track. In one embodiment, detector 10 is not disposed on a train. Instead, a plurality of detectors are preferably provided and connected such that each detector is coupled to a respective track segment. Embodiments of the present invention preferably do not depend on direct current ("DC") or alternating current ("AC") current methods that detect rail breaks by loss of current flow as such methods are subject to false results created by environmental rail-to-rail and rail-to-earth leakage. Because detector 10 is preferably stationary and trains approach pass by detector 10, in one embodiment, the axles of every moving train move with respect to detector 10.

INDUSTRIAL APPLICABILITY

The invention is further illustrated by the following non-limiting examples.

Example 1

Figure 3A:
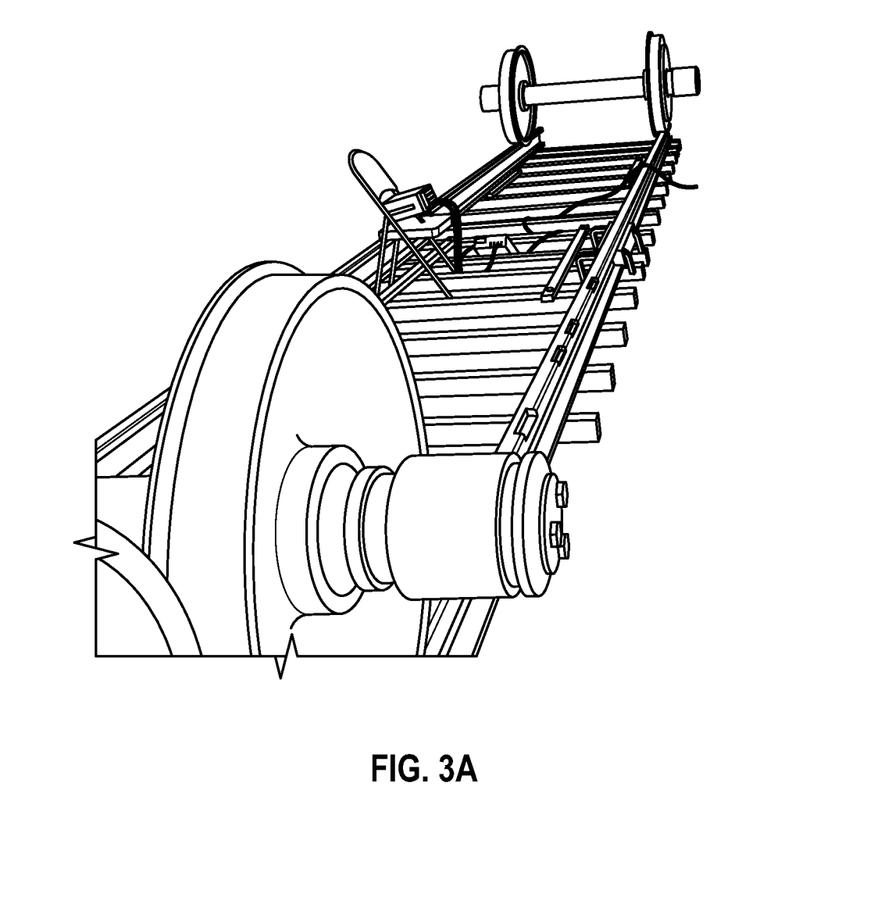
FIG. 3A is a drawing which illustrates a test setup wherein an embodiment of the present invention was constructed and tested in a lab.
Figure 3B:
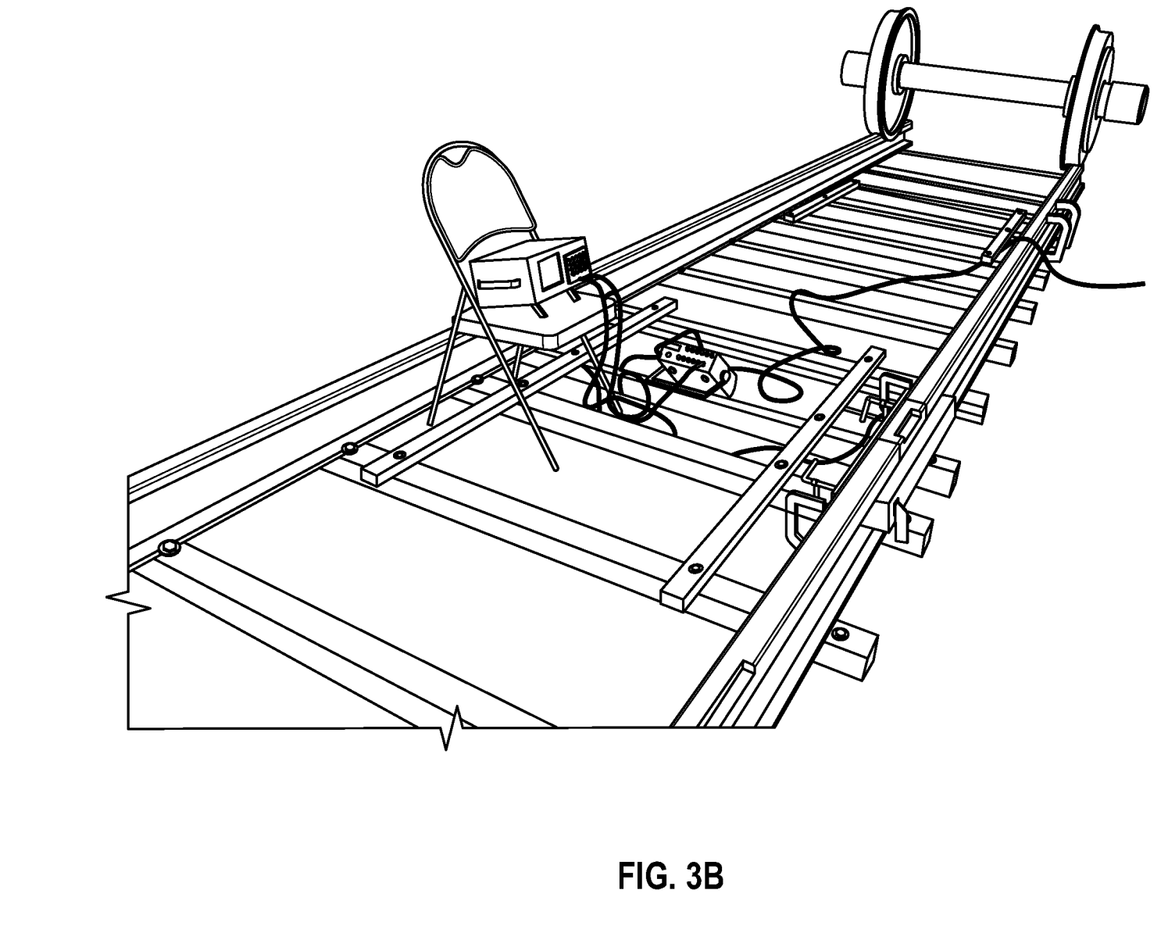
FIG. 3B is a drawing which illustrates the area of the test setup wherein the electrical connection was made on one of the rails for the connection of the electrical components.

A portion of a test rail track was constructed along with an apparatus according to an embodiment of the present invention (see FIGS. 3A and 3B).

This first test was setup to test a broken rail detector using a 40-foot test rail in a test laboratory, in order to evaluate parallel inductive loops that are formed in the test rail. The equipment used in the test included, the test rail, a frequency generator, an oscilloscope, an inductance meter, a digital voltmeter, and a current sense resistor. A schematic of the test setup is illustrated in FIG. 1A. For the test, resistor 21 was used and had a value of 60 ohms. Point 32 was connected to channel A of the oscilloscope. Point 30 was connected to channel B of the oscilloscope. The signal generator was used without additional amplification.

Table 1 summarizes measurements taken when no break was provided in the rails.

TABLE 1

| Frequency (kHz) | Gen. Amplitude (V p-p) | Rail Amplitude (V p-p) | Phase Delay (µS) |
|---|---|---|---|
| 150.00 | 2.0 | 0.28 | −0.95 |
| 49.69 | 2.0 | 0.13 | −3.0 |

Table 2 summarizes measurements taken when a break was provided in one of the rails.

TABLE 2

| Frequency (kHz) | Gen. Amplitude (V p-p) | Rail Amplitude (V p-p) | Phase Delay (µS) |
|---|---|---|---|
| 150.38 | 2.0 | 0.48 | −0.75 |
| 49.69 | 2.0 | 0.31 | −2.0 |

Given the greater than 400:1 ratio between the rail loop resistance and the signal injection series resistor, less than 0.005V of the rail amplitude value can be attributed to changes in the DC resistance of the test track when it was broken. As previously noted, the DC resistance was below measurable limits under both break and no-break conditions.

Environmental rail-to-rail and rail-to-earth leakage was not simulated in this test but would not likely appear as a ratio change in the signal rail amplitudes; instead it would appear as a change in absolute signal value. Therefore, two widely separated signal frequencies are preferably used. Changes in inductance manifest as a change in the ratio of the amplitudes and phase shift of the two test frequencies. The amplitude ratio between frequencies for no break was found to be 2.15, while the amplitude ratio between frequencies for a break was found to be 1.54. Likewise, the phase ratio between frequencies for no break was found to be 0.32, while the phase ratio between frequencies for a break was found to be 0.38. The phase ratio for 150 kHz between break and no break conditions was found to be 1.27, while the phase ratio for 50 kHz between break and no break conditions was found to be 1.5. Thus, it was found that there was a very clear response in the measurements achieved between the break and no break conditions.

Example 2

After the successful test of Example 1 above, an embodiment of the present invention was constructed and tested on live track test sections that were up to two miles long. Rail break and train presence detection was tested and found to work as described. The described method for compensating for environmental effects was also tested and found to perform well. For this test, the following equipment was used: a PicoScope digital oscilloscope, a 15 watt ("W") linear audio power amplifier, three 1.5-ohm power resistors; a portable generator (for field power), clip leads, a FLUKE® (a registered trademark of Fluke Corporation) model 77 multimeter, a Brunelle 3200 LC meter, and a signal generator. The response of signal amplitude and phase to train presence and simulated rail break, shunt removal in this case, was consistent with expectations.

The test setup was connected as schematically illustrated in FIG. 1A. For the test, the resistor had a value of 5.2 ohms. Point 32 of the schematic of FIG. 1A was connected to channel A of the oscilloscope, while point 30 was connected to channel B of the oscilloscope. The signal generator included a 15-watt amplifier being driven from a signal generator. The 5.2 ohm series resistors used were rated at 50 W. The 15 W linear amplifier was used to drive the rail. Shunt 1 was in place at mile 96.5, while the test site was at mile 97.0. This shunt was a permanent shunt associated with existing crossing detection equipment.

Because it was impractical to intentionally create a break in an active section of track, we instead removed one of the shunts to simulate a break. Table 4 shows the results of tests when the break was simulated. The following values were measured/determined:

1) Initial DCR=~0.2 ohm
2) Shunt 2 was placed at mile 97.5.
3) Inductance was 12.6 mH
4) DCR=~0.2 ohm
5) Difference with shunt in and shunt out. Voltage differential was calculated as:

$dVi = VA - VB$ for shunt in $dVo = VA - VB$ for shunt out $d\text{Phase} = \text{Phase Delay In} - \text{Phase Delay Out}$ $dV = dVi - dVo$ Table 3 shows the results of tests when both shunts were in place while Table 4 shows the results of tests when shunt 2 was removed to simulate a broken rail. Table 5 shows the results of the comparison of the unbroken track segment and the simulated broken segment.

TABLE 3

| Frequency (Hz) | Voltage at Test Point A (Vp-p) | Voltage at Test Point B (Vp-p) | Phase Delay at Test Point B (uS) |
|---|---|---|---|
| 150 | 19.30 | 6.11 | 371.8 |
| 300 | 19.57 | 6.52 | 304.5 |
| 1000 | 19.69 | 10.72 | 66.2 |
| 4000 | 19.69 | 13.40 | 8.6 |
| 10000 | 19.66 | 14.81 | 2.6 |

TABLE 4

| Frequency (Hz) | Voltage at Test Point A (Vp-p) | Voltage at Test Point B (Vp-p) | Phase Delay at Test Point B (uS) |
|---|---|---|---|
| 150 | 19.37 | 7.05 | 330.8 |
| 300 | 19.56 | 7.41 | 262.9 |
| 1000 | 19.53 | 10.41 | 46.9 |
| 4000 | 19.48 | 13.30 | 9.1 |
| 10000 | 19.46 | 15.04 | 2.3 |

TABLE 5

| Frequency (Hz) | dVi (V) | dVo (V) | dV (V) | dPhase (us) |
|---|---|---|---|---|
| 150 | 13.19 | 12.32 | 0.87 | 41.0 |
| 300 | 13.05 | 12.15 | 0.90 | 41.6 |
| 1000 | 8.97 | 9.12 | −0.15 | 19.3 |
| 4000 | 6.29 | 6.18 | 0.11 | −0.5 |
| 10000 | 4.85 | 4.42 | 0.43 | 0.3 |

During the test, a clearly measurable difference in voltage and/or phase was noted at most frequencies—thus indicating that the concept of the invention is valid. Tests were also done with shunt 2 placed at about mile 98.5, thus creating a span of two miles between shunt 1 and shunt 2. A difference was noted at each of 1000 Hz and 300 Hz but there was not time to capture the detailed data due to an oncoming train. Train presence showed the expected opposite trends in voltage and phase at 300 Hz, with a clear downward trend as the train approached the test location and an increasing trend as it left the test location. The tests clearly indicated the ability to detect both rail break and train presence conditions.

The preceding example can be repeated with similar success by substituting the generically or specifically described components and/or operating conditions of embodiments of the present invention for those used in the preceding examples.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. All computer software can be embodied on any non-transitory computer-readable medium (including combinations of mediums), including without limitation CD-ROMs, DVD-ROMs, hard drives (local or network storage device), USB keys, other removable drives, ROM, and firmware.

The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Note that in the specification and claims, "about" or "approximately" means within twenty percent (20%) of the amount or value given.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A method for detecting a condition of rail tracks comprising:
    forming segments of the rail tracks by coupling shunts between rails of the rail tracks at intervals;
    providing a plurality of detectors and coupling a respective one of the plurality of detectors to a respective one of the formed segments of rail tracks, wherein axles of all moving trains move with respect to the plurality of detectors;
    providing at least two frequencies of alternating electrical current to the respective one of the formed segments of rail tracks;
    evaluating a change in signal amplitude above a baseline reference in at least one of the at least two frequencies, and evaluating a phase angle difference between the at least two frequencies of alternating electrical current; and
    detecting the condition based on a change in the signal amplitude and phase angle difference between the at least two frequencies.

2. The method of claim 1 wherein the shunts comprise wires.

3. The method of claim 1 wherein the shunts comprise cables.

4. The method of claim 1 wherein the shunts comprise filters that are tuned to pass operating frequencies but attenuate other frequencies.

5. The method of claim 4 wherein the other frequencies comprise direct current.

6. The method of claim 1 further comprising forming a bypass section of rail tracks by disposing the shunts on both sides of the bypass section and not disposing a detector in the bypassed section.

7. The method of claim 6 wherein forming a bypass section comprises forming a bypass section at or near a location of rail equipment such that the rail equipment lies within the formed bypass section.

8. The method of claim 7 wherein the rail equipment comprises a wheel condition detector.

9. The method of claim 1 wherein the condition comprises a rail switch position.

10. The method of claim 1 wherein the condition comprises a break in a portion of the rail tracks.

11. The method of claim 10 wherein detecting the break condition comprises detecting the break when a positive amplitude shift relative to an amplitude of a higher of the at least two frequencies from the baseline reference is observed in a lower of the at least two frequencies of alternating electrical current in combination with a negative phase shift relative to a phase shift of a lower of the at least two frequencies in a higher of the at least two frequencies of alternating electrical current.

12. The method of claim 1 wherein the condition comprises a train presence condition when a train is disposed on at least one of the segments of the rail tracks.

13. The method of claim 12 wherein detecting the train presence condition comprises detecting a negative amplitude shift for the at least two frequencies in addition to a positive phase shift for the at least two frequencies.

14. The method of claim 1 wherein the baseline reference is compensated for environmental effects by normalizing signal amplitude values relative to phase values when no trains are present and when no breaks are present.

15. The method of claim 1 wherein the condition comprises rail stress change.

16. The method of claim 15 wherein the rail stress change is formed in response to a break in at least one of the segments of rail tracks at a location other than a segment of the rail tracks where the rail stress is detected.

17. The method of claim 15 wherein the rail stress is formed by thermal expansion or thermal contraction of the rails of the rail tracks.

18. A detector comprising:
a circuit configured to provide at least two frequencies of alternating electrical current to a shunted segment of a track;
said circuit configured to measure an amplitude difference and a phase angle between the at least two frequencies of alternating electrical current and identify a break in at least a portion of the track based on a change in the measured amplitude difference and phase angle; and
said detector not disposed on a train or moving vehicle.

19. The detector of claim 18 wherein said detector does not travel with respect to the shunted segment of the track while said detector is in operation.

20. The detector of claim 18 wherein said circuit provides the at least two frequencies of alternating electrical current via a direct electrical connection to rails of the shunted segment of the track.

21. The detector of claim 18 wherein said circuit provides the at least two frequencies of alternating electrical current via induction into a rail of the shunted segment of the track.

22. The detector of claim 18 wherein said circuit is configured to measure via direct electrical connection to rails of the shunted segment of the track.

23. The detector of claim 18 wherein said circuit is configured to measure via induction into a rail of the shunted segment of the track.

24. The detector of claim 18 further comprising an isolation transformer.

25. The detector of claim 18 wherein said circuit is configured to provide at least two frequencies of alternating electrical current into two shunted segments of a track.

26. The detector of claim 25 wherein the two shunted segments of a track comprise two adjacent segments of a track.

27. The detector of claim 18 wherein the amplitude difference comprises a difference between a current amplitude and a reference amplitude.

28. The detector of claim 18 wherein the phase angle between the at least two frequencies of alternating electrical current comprises a difference between a current phase and a reference phase.

29. A method for detecting a condition of rail tracks comprising:
forming segments of the rail tracks by coupling shunts between rails of the rail tracks at intervals;
providing a plurality of detectors and coupling a respective one of the plurality of detectors to a respective one of the formed segments of rail tracks;
forming a bypass section of rail tracks at or near a location of rail equipment such that the rail equipment lies within the formed bypass section by disposing the shunts on both sides of the bypass section and not disposing a detector in the bypassed section;
providing at least two frequencies of alternating electrical current to the respective one of the formed segments of rail tracks;
evaluating a change in signal amplitude above a baseline reference in at least one of the at least two frequencies, and evaluating a phase angle difference between the at least two frequencies of alternating electrical current; and
detecting the condition based on a change in the signal amplitude and phase angle difference between the at least two frequencies.

30. The method of claim 29 wherein the shunts comprise filters that are tuned to pass operating frequencies but attenuate other frequencies.

31. The method of claim 30 wherein the other frequencies comprise direct current.

32. The method of claim 29 wherein the condition comprises a rail switch position.

33. The method of claim 29 wherein the condition comprises a break in a portion of the rail tracks.

34. The method of claim 33 wherein detecting the break condition comprises detecting the break when a positive amplitude shift relative to an amplitude of a higher of the at least two frequencies from the baseline reference is observed in a lower of the at least two frequencies of alternating electrical current in combination with a negative phase shift relative to a phase shift of a lower of the at least two frequencies in a higher of the at least two frequencies of alternating electrical current.

35. The method of claim 29 wherein the condition comprises a train presence condition when a train is disposed on at least one of the segments of the rail tracks.

36. The method of claim 35 wherein detecting the train presence condition comprises detecting a negative amplitude shift for the at least two frequencies in addition to a positive phase shift for the at least two frequencies.

37. The method of claim 29 wherein the baseline reference is compensated for environmental effects by normalizing signal amplitude values relative to phase values when no trains are present and when no breaks are present.

38. The method of claim 29 wherein the condition comprises rail stress change.

39. A method for detecting a break in a portion of rail tracks comprising:
forming segments of the rail tracks by coupling shunts between rails of the rail tracks at intervals;
providing a plurality of detectors and coupling a respective one of the plurality of detectors to a respective one of the formed segments of rail tracks;
providing at least two frequencies of alternating electrical current to the respective one of the formed segments of rail tracks;
evaluating a change in signal amplitude above a baseline reference in at least one of the at least two frequencies, and evaluating a phase angle difference between the at least two frequencies of alternating electrical current; and
detecting the break based on a change in the signal amplitude and phase angle difference between the at least two frequencies when a positive amplitude shift relative to an amplitude of a higher of the at least two frequencies from the baseline reference is observed in a lower of the at least two frequencies of alternating electrical current in combination with a negative phase shift relative to a phase shift of a lower of the at least two frequencies in a higher of the at least two frequencies of alternating electrical current.

40. The method of claim 39 wherein the shunts comprise filters that are tuned to pass operating frequencies but attenuate other frequencies.

41. The method of claim 40 wherein the other frequencies comprise direct current.

42. The method of claim 39 wherein the condition comprises a rail switch position.

43. The method of claim 39 wherein the condition comprises a train presence condition when a train is disposed on at least one of the segments of the rail tracks.

44. The method of claim 43 wherein detecting the train presence condition comprises detecting a negative amplitude shift for the at least two frequencies in addition to a positive phase shift for the at least two frequencies.

45. The method of claim 39 wherein the baseline reference is compensated for environmental effects by normalizing signal amplitude values relative to phase values when no trains are present and when no breaks are present.

46. The method of claim 39 wherein the condition comprises rail stress change.

47. A method for detecting train presence on rail tracks comprising:
forming segments of the rail tracks by coupling shunts between rails of the rail tracks at intervals;
providing a plurality of detectors and coupling a respective one of the plurality of detectors to a respective one of the formed segments of rail tracks;
providing at least two frequencies of alternating electrical current to the respective one of the formed segments of rail tracks;
evaluating a change in signal amplitude above a baseline reference in at least one of the at least two frequencies, and evaluating a phase angle difference between the at least two frequencies of alternating electrical current; and
detecting the train presence when a train is disposed on at least one of the segments of rail tracks based on a negative amplitude shift for the at least two frequencies in addition to a positive phase shift for the at least two frequencies.

48. The method of claim 47 wherein the shunts comprise filters that are tuned to pass operating frequencies but attenuate other frequencies.

49. The method of claim 48 wherein the other frequencies comprise direct current.

50. The method of claim 47 wherein the condition comprises a rail switch position.

51. The method of claim 47 wherein the condition comprises a break in a portion of the rail tracks.

52. The method of claim 51 wherein detecting the break condition comprises detecting the break when a positive amplitude shift relative to an amplitude of a higher of the at least two frequencies from the baseline reference is observed in a lower of the at least two frequencies of alternating electrical current in combination with a negative phase shift relative to a phase shift of a lower of the at least two frequencies in a higher of the at least two frequencies of alternating electrical current.

53. The method of claim 47 wherein the baseline reference is compensated for environmental effects by normalizing signal amplitude values relative to phase values when no trains are present and when no breaks are present.

54. The method of claim 47 wherein the condition comprises rail stress change.

55. A method for detecting a condition of rail tracks comprising:
forming segments of the rail tracks by coupling shunts between rails of the rail tracks at intervals;
providing a plurality of detectors and coupling a respective one of the plurality of detectors to a respective one of the formed segments of rail tracks;
providing at least two frequencies of alternating electrical current to the respective one of the formed segments of rail tracks;
evaluating a change in signal amplitude above a baseline reference in at least one of the at least two frequencies, and evaluating a phase angle difference between the at least two frequencies of alternating electrical current;
compensating the baseline reference for environmental effects by normalizing signal amplitude values relative to phase values when no trains are present and when no breaks in the rail tracks are present; and
detecting the condition based on a change in the signal amplitude and phase angle difference between the at least two frequencies.

56. The method of claim 55 wherein the shunts comprise filters that are tuned to pass operating frequencies but attenuate other frequencies.

57. The method of claim 56 wherein the other frequencies comprise direct current.

58. The method of claim 55 wherein the condition comprises a rail switch position.

59. The method of claim 55 wherein the condition comprises a break in a portion of the rail tracks.

60. The method of claim 59 wherein detecting the break condition comprises detecting the break when a positive amplitude shift relative to an amplitude of a higher of the at least two frequencies from the baseline reference is observed in a lower of the at least two frequencies of alternating electrical current in combination with a negative phase shift relative to a phase shift of a lower of the at least two frequencies in a higher of the at least two frequencies of alternating electrical current.

61. The method of claim 55 wherein the condition comprises a train presence condition when a train is disposed on at least one of the segments of the rail tracks.

62. The method of claim 61 wherein detecting the train presence condition comprises detecting a negative amplitude shift for the at least two frequencies in addition to a positive phase shift for the at least two frequencies.

63. The method of claim 55 wherein the condition comprises rail stress change.

* * * * *